(12) United States Patent
Kaya

(10) Patent No.: US 8,664,295 B2
(45) Date of Patent: Mar. 4, 2014

(54) POLYMERIC COMPOUND, METHOD OF PREPARING A POLYMERIC COMPOUND, USE OF A POLYMERIC COMPOUND

(75) Inventor: Mustafa Kaya, Roosendaal (NL)

(73) Assignee: Nutripol Capital Sarl, Luxembourg (LU)

( * ) Notice: Subject to any disclaimer, the term of this patent is extended or adjusted under 35 U.S.C. 154(b) by 347 days.

(21) Appl. No.: 12/084,219

(22) PCT Filed: Oct. 28, 2005

(86) PCT No.: PCT/NL2005/000770
§ 371 (c)(1),
(2), (4) Date: Apr. 28, 2008

(87) PCT Pub. No.: WO2007/049952
PCT Pub. Date: May 3, 2007

(65) Prior Publication Data
US 2009/0043010 A1    Feb. 12, 2009

(51) Int. Cl.
*C08K 5/00* (2006.01)
*C08G 63/91* (2006.01)
*C08G 63/48* (2006.01)
*C08L 5/00* (2006.01)

(52) U.S. Cl.
USPC ............. 523/124; 523/128; 524/27; 524/238; 525/54.2; 525/54.21

(58) Field of Classification Search
USPC ............. 523/128, 122, 124; 525/54.2, 54.21; 524/9, 27, 238
See application file for complete search history.

(56) References Cited

U.S. PATENT DOCUMENTS

| | | | |
|---|---|---|---|
| 5,013,769 A * | 5/1991 | Murray et al. | 424/78.06 |
| 5,618,799 A * | 4/1997 | Inagi et al. | 514/53 |
| 5,621,026 A * | 4/1997 | Tanaka et al. | 524/52 |
| 6,136,334 A * | 10/2000 | Viegas et al. | 424/427 |
| 6,143,384 A * | 11/2000 | Tanaka et al. | 428/35.8 |
| 7,226,972 B2 * | 6/2007 | Zhao et al. | 525/61 |
| 2004/0127699 A1* | 7/2004 | Zhao et al. | 536/53 |
| 2005/0255172 A1* | 11/2005 | Omidbakhsh | 424/616 |
| 2007/0009582 A1* | 1/2007 | Madsen et al. | 424/445 |

\* cited by examiner

*Primary Examiner* — Kriellion Sanders
(74) *Attorney, Agent, or Firm* — Nath, Goldberg & Meyer; Joshua B. Goldberg

(57) ABSTRACT

Described is a polymeric compound comprising a polyvinyl alcohol, a carbohydrate, and a polyacrylic acid, in which compound the carbohydrate is present as a cross-linking agent which cross-links chains of polyvinyl alcohol and/or chains of polyacrylic acid. The novel compound has interesting properties as an alternative to known plastics materials. It is biologically degradable, has a reduced content of fossil starting material, and exhibits hardness and flexibility properties useful for widespread applications, such as packaging material and coatings. In addition, a method for producing the polymeric compound is disclosed.

13 Claims, No Drawings

POLYMERIC COMPOUND, METHOD OF PREPARING A POLYMERIC COMPOUND, USE OF A POLYMERIC COMPOUND

The invention relates to a novel polymeric compound. Most synthetic polymeric compounds are based on fossil starting material. This has drawbacks because retrieving the starting material is cumbersome, and the supply of fossil starting material is finite, and is lately becoming more scarce. At present, the prices of fossil starting material are rising and this is foreseen to continue in the future, so that the above drawbacks will become more imminent. There have lately been developments in the field of so-called bio-polymers, e.g. based on cellulose. These polymers are meant to provide an alternative to the above polymeric compositions. However, the use of these polymers is in some respects limited and leaves room for improvement.

Thus there exists a general need for providing alternative polymeric compounds that have a wider range of use than known bio-polymers and preferably mimic the properties of known polymeric compounds which are based on fossil starting material. From an environmental point of view, it is in general advantageous if the alternative polymeric compound can biologically be degraded, because it reduces the waste problem and further decreases the mass production of polymers and plastics made of oil products.

The object of the invention is to achieve in part or fully, one or more of the above general needs.

The object is achieved by providing a polymeric compound comprising a polyvinyl alcohol, a carbohydrate and a polyacrylic acid, wherein at least part of the carbohydrate cross-links polyvinyl alcohol and/or polyacrylic acid. It has been found that the carbohydrate is present in the compound as a cross-linking agent for the chains of polyvinyl alcohol (PVA) and/or polyacrylic acid (PAA), resulting in a novel polymeric compound. The cross-linking can be between different type of chains, i.e. between PVA and PAA, but also between the same type of chains, i.e. cross-linking PVA chains together, or cross-linking PAA chains together.

It is remarked that the term polymeric compound in this application is used in the meaning of a polymeric material having the claimed composition.

It is noted that the carbohydrate is present in the compound as an individual component, separate from the components PVA and PAA, and that not necessarily all carbohydrate acts as a cross-linking agent, i.e. parts of the carbohydrate may be coupled to the chains of PVA or PAA as a mere branched part of these chains, or parts of carbohydrate may be physically mixed with PVA and PAA in the compound, i.e. not being chemically bonded to either component. The specific degree of cross-linking by the carbohydrate depend on the conditions of preparation of the compound, especially the respective amounts of the components that are used while preparing the compound, as will be obvious for the skilled person. It is remarked that the cross-linking of carbohydrate includes both a chemical bonding, e.g. by an ether or ester bond, but also a coordinative bonding, e.g. by hydrogen bridges and salt bridges.

By the term 'polyvinyl alcohol' in the claims, is meant plain PVA and/or a derivative thereof. The polyvinyl alcohol may be composed of different grades. PVA may thus comprise a mixture of several grades of PVA, e.g. of different molecular weight. The amount of PVA is preferably not higher than 50 wt. %, and should at least be 0.2 wt. % of the compound.

Examples of derivatives of PVA of the invention, are polyvinyl alcohol wherein the monomer unit has a branched substituent being a lower alkyl, e.g. C1-C4 alkyl, such as methyl, ethyl, propyl, butyl etc; or wherein the monomer unit is extended by alkylidene groups present between the vinyl moiety and the alcohol moiety, such as 3-hydroxy-propylene having an intermediate methylene group.

The same applies to the term 'polyacrylic acid', which includes plain PAA and/or a derivative thereof. The polyacrylic acid may be composed of different grades. PAA may thus comprise a mixture of several grades of PAA, e.g. of different molecular weight. The amount of PAA is preferably not higher than 80 wt. % and should at least be 5 wt. % of the compound.

Examples of derivatives of PAA of the invention, are polyacrylic acid wherein the monomer unit has a branched substituent being a lower alkyl, e.g. C1-C4 alkyl, such as methyl, ethyl, propyl, butyl etc; or wherein the monomer unit is extended by alkylidene groups present between the vinyl moiety and the carboxyl acid moiety, such as 3-carboxy-propylene having an intermediate methylene group.

By carbohydrate is meant any type of saccharide, such as mono-, di- or polysaccharides. The amount of carbohydrate is preferably not higher than 80 wt. % and should at least be 2 wt. % of the compound.

It has been found that the carbohydrate moiety makes the polymeric compound bio-degradable, i.e. living organisms can degrade or decompose the carbohydrate structures in the compound by their metabolism, resulting in separate chains of PAA and PVA. The resulting separate chains of PAA and PVA can be further recycled, wherein also PAA can be decomposed biologically.

Advantageously, the disaccharide of glucose and fructose, i.e. saccharose—also known as sucrose—is used in the invention. Saccharose is advantageous because it is abundant, has a relatively low price, and has proven to establish the required cross-links between PVA and PAA. It has also proven to be a carbohydrate which is easily handled in the process of preparing the polymeric compound, in terms of solubility and homogeneity.

The carbohydrate moiety also influences the price of production of the polymeric compound, because by using this natural product as one of the components, the dependence of more expensive fossil starting materials is reduced. This reduction in fossil starting materials in the polymeric compound is also advantageous from a point of view of reducing the depletion rate of fossil starting materials.

The polymeric compound as a whole has proven to have interesting properties which make the compound apt for a wide range of applications as will be shown hereinafter.

Preferably, the polyacrylic acid in the polymeric compound according to the invention, comprises addition salts of polyacrylic acid. It was found that, when the carboxyl groups of PAA were transformed into carboxylate groups with ionically bonded metal groups the hardness of the polymeric compound could be enhanced. Dependent on the aimed application of the polymeric compound, the PAA chains comprise a high or low degree of addition salts. Advantageously, alkali metals or alkaline earth metals are used in forming addition salts, such as Na or Ba. However in principle any metal that coordinates with the carboxylate group may be used. In general the salt content in the compound is not higher than 40 wt. % and should at least be 0.2 wt. %.

Advantageously, a pigment is added to the polymeric compound. Preferably titanium dioxide is added to the compound for good coloring effects and a sufficient degree of reflection of sunlight.

In a preferred embodiment of the invention, the polymeric compound comprises water. When the polymeric compound is prepared by a preferred method described below, then there is always a residue of water in the polymeric compound because of the production process uses in part water as a solvent. However, in making the compound apt for certain applications, it is interesting to have a more specific content of water remaining in the polymeric compound. Most water is incorporated in the compound via hydrogen bonds with carboxyl and/or hydroxyl groups of the PAA and PVA chains.

In a relatively hard, solid polymeric compound the content water is not higher than 10 wt. %. It is noted that this water content balances with the degree of addition salts on the PAA chain, because a high degree of addition salts shields the carboxylate groups and thus reduces the bonding sites of PAA for water molecules to be incorporated in the compound via hydrogen bonds. Such a polymeric compound has properties comparable to known plastics products such as PE or PET. For instance, a glass transition temperature (Tg) of 85 degrees Centigrade has been measured for the polymeric compound of the invention (see Example). The value of Tg is largely influenced by the water content of the compound.

A less hard, but more flexible, solid polymeric compound, has a water content above 10 wt. %, e.g. 40 wt. %. Such a polymeric compound has properties comparable to known products as cellophane, with resembling break at yield, barrier properties, reflection of light, vapor permeability, etc.

As will be described in more detail below, it also interesting to provide the polymeric compound in the form of a gel or jelly-like material, having a high water content of more than 9 wt. %, but not higher than 40 wt. %.

Preferably, the polymeric compound according to the invention, comprises a surfactant, such as a soap, a proteine, or a (alkyl)betaine. As will be explained below in detail in regard of the method to prepare the compound, a surfactant has the effect of establishing a better of homogeneity of the compound, both in the production process as well as in the end product obtained thereafter. This effect establishes a better reproducibility of the compound so that the compound has properties which are more reliable when taking different samples or batches.

More preferably, the polymeric compound according to the invention, comprises a dispersing agent, so that in gel form the compound has appropriate flowing characteristics for the different applications as will be explained below in regard of the use of the compound. Also, the dispersing agent has positive effects on the method to prepare the product, because the mixing of a homogeneous mass is made easier, as will be explained below.

Further by preference, an elasticity improving agent or plasticizer is comprised in the compound according to the invention. The plasticizer encompasses e.g. a fatty acid, glycerol, or esters of phtalic acid, of phosphoric acid, or of citric acid. The plasticizer has the effect of improving the elongation properties of the compound and can also be used as flexibility improving agent as an alternative to the water content in the compound as explained above. Thus, when less water content is preferred, the compound may still exhibit flexibility properties comparable with higher water contents, if a plasticizer is comprised in the compound. The plasticizer also positively influences further processing of compound by reducing the required temperature for molding the compound.

It is also preferred that the compound according to the invention comprises a biocide, in particular an anti-fungus agent, in order to reduce the risk that fungi decompose the compound. In fact, the addition of a biocide is also a balancing act, because it prolongs the lifetime of the compound, although on the other hand it is advantageous if it can be decomposed in a biologically manner. When for instance the compound is used as an alternative for PET, for bottles, the commercial lifetime of such a bottle is 6-12 months, after which it is recycled. An appropriate biocide content for an article can be established by the skilled person by correlation to the required lifetime of that article.

In a second aspect, the invention relates to a method of preparing a polymeric compound comprising the steps of:
i) preparing a mixture of a polyvinyl alcohol and a carbohydrate in water
ii) adding polyacrylic acid to the mixture obtained by i).

Apart from the above advantages as stated for the polymeric compound itself, the method has the additional advantage that a method is now given by which this compound can be obtained, which was not disclosed before and which proved to be more cumbersome than it looks prima facie.

Preferably, the mixture of step i) contains amounts of PVA and carbohydrate that correspond to the preferred final content in the polymeric compound as stated above. Analogously, the amount of PAA corresponds to the preferred final content in the polymeric compound as stated above. During preparation, the water content may vary but is in general not higher than 70 wt. %.

Advantageously the mixture of step i) is warmed above room temperature, e.g. 50 degrees Centigrade or higher, and the same level of warming applies to the amount of PAA that is added in step ii). Preferably in step i), PVA is first dispersed in water, and carbohydrate is added thereafter, to obtain an appropriate mixture. Advantageously the addition of PAA is performed by dosing small amounts to the mixture of step i). All the preparation details named in this paragraph are mainly directed to enhance the homogeneity of the final mixture obtained after step ii). As explained above the homogeneity has several advantageous effects on the end product. To improve the homogeneity further, one can add PAA to the mixture by passing it through a filter, e.g. <10 micrometer. This is especially advantageous when the PAA contains addition salts, as is explained below.

Preferably, the method according to the invention, further comprises a step prior to step ii), wherein polyacrylic acid is mixed with a metal salt. As such, a final compound can be prepared wherein the PAA chains bear addition salts to a certain extent, leading to advantages explained above.

The addition of metal salts is advantageously performed in a dosed manner, so that no violent reactions occur. The metal salts may be added in dry form. The relative amount of salt added to PAA is dependent on the required degree of hardness as explained above.

According to a further preference, the method according to the invention, further comprises a step subsequent to ii), of iii) adding to the mixture obtained by ii),
an amount of one or more additives chosen from the group consisting of: a surfactant, a dispersing agent, a plasticizer, and a biocide. In addition to the advantageous effects of the above group of additives already explained above in relation the final compound, the additives achieve further advantages in regard of the method itself.

The amount of each additive is not higher than an amount corresponding to a 40 wt. % content in the final compound and should at least be 0.05 wt. %, preferably the content is not higher than 5 wt. %.

While performing the method of the invention, the intermediate products easily show formation of strains of polymeric components (e.g. of separate PAA of PVA structures) which negatively affect the preparation by formation of inhomogeneties in mixtures, and consequently in the final compound as well. The formation of these strains start by a sort of crystallization process, which can be halted by using surfactants, thus improving the homogeneity. This has also a second advantage: the less strains are formed during preparation, the less cumbersome is the performance of a filtration step, which is commonly done after step iii).

The dispersing agent has positive effects on the preparation of the product, because the mixing of the components into a homogeneous mass is improved. As a surfactant (alkyl)betaine is preferred, because it has proven to lower the unwanted formation of foam during mixing, and also works in lowering the unwanted formation of strains with the advantages explained above.

Advantageously the mixture added in step iii) contains in addition a solution of a carbohydrate, because it acts as a filler for the mixture in step iii) on the one side, and on the other side it improves the cross-linking function of carbohydrate in the final compound, by adding the carbohydrate in two stages, i.e. step i) and step iii). Of course, the amounts of step i) and iii) are in total adding up and as such correspond to the preferred weight content of carbohydrate in the final compound.

To give general indications of the relative amounts of the components used in step i) ii) and iii), the following relationship applies: i)>ii)>iii). The skilled person can apply dependent on the exact conditions, the exact relative amounts, also dependent on the specific composition that is required for the final polymeric compound.

During step i), a problem of an unwanted formation of strains of polymers and of gas bubbles in the mixture is preferably diminished by adding a small quantity of a lower alcohol, e.g. methanol, ethanol, propanol, to the mixture of PVA and carbohydrate. It has been observed that this leads to a better quality of the final compound. The alcohol used in step i), largely evaporates during preparation, so that the final composition does not contain more than small traces of the alcohol.

The invention also relates to the product obtainable by the method according to the invention as set out above and in the respective claims.

In a third aspect, the invention relates to a use of a polymeric compound according to the invention, wherein the compound is used as packaging material for foods, in particular bottles. These packaging materials have short-cycle lifetimes, making them most interesting for the polymeric compound of the invention for reasons given above.

The polymeric compound can be used as a packaging material in general. Dependent on the specific type of packaging, one can easily adjust the properties of hardness, flexibility, lifetime, biodegradability etc.

The polymeric compound can be used as an alternative to known plastics and their applications, such as in automotive industry, for toys, as medical devices, housings such as for telephones etc.

Advantageously, the polymeric compound is used as a thin film of flexible material. This thin film is an excellent alternative to cellophane.

In the form of a gel, the compound according to the invention is advantageously used as a starting product for extrusion processes, thus eliminating the production of preformed solid grains, and lowering the required temperature of the process. The same advantages apply to the use of the gel in injection molding or blow molding, which is another preferred embodiment.

Furthermore, the compound according to the invention is advantageously used as an additive to a lacquer, paint or coating, as it positively influences the adhesion thereof onto the substrate on which it is applied. Also, in applying the paint including the inventive compound as an additive, it is observed that pores in the substrate on which the paint is applied are at least partly closed, so that less paint is absorbed into the substrate, e.g. a wall. This makes the inventive compound in particular suited as an additive to a primer, i.e. a paint that is applied as a first layer onto a substrate.

Example of a Gel-Like Product of the Invention

A gel-like compound was prepared having the following composition:

| Component | (commercial name) | wt. % |
| --- | --- | --- |
| PVA | (Airvol 125-325) | 9.7 |
| Sucrose | | 20.1 |
| Demin. Water | | 39 |
| PAA | (Neocryl Hx-39) | 28.5 |
| Sodiumbicarbonate | | 1.5 |
| Betaine | (Empigem BB) | 1 |
| Biocide | (Parmenthol K40) | 0.2 |

The gel-like compound was prepared by performing the above described steps i)-ii)-iii) of the method of the invention, wherein prior to step ii), sodium bicarbonate was mixed with PAA.

The gel of the above composition was used as a starting material to form a cellophane product using conventional means to form a thin film out of a polymeric compound in a molten state.

A melting temperature of 210 degrees Centigrade has been measured for the cellophane product formed. A glass transition temperature of 85 degrees Centigrade has been measured.

The invention claimed is:

1. A biodegradable polymer composition comprising a polyvinyl alcohol, a sodium addition salt of a polyacrylic acid and sucrose; wherein the polyvinyl alcohol and the sodium addition salt of the polyacrylic acid are crosslinked by sucrose in an amount ranging from 2 to 80% by weight in water at a temperature of 50° C. or higher; and wherein sucrose is crosslinked with the polyvinyl alcohol and the polyacrylic acid by chemical bonding via an ether or ester bond and by coordinative bonding via hydrogen bridges and salt bridges.

2. The biodegradable polymer according to claim 1, wherein the polyvinyl alcohol is present in the composition in an amount not greater than 50.0% by weight.

3. The biodegradable polymer according to claim 1, wherein the polyvinyl alcohol is present in the composition in an amount not less than 0.2% by weight.

4. The biodegradable polymer composition according to claim 1, wherein the polyacrylic acid is present in the composition in an amount not greater than 80.0% by weight.

5. The biodegradable polymer composition according to claim 1, wherein the polyacrylic acid is present in the composition in an amount not less than 5.0% by weight.

6. The biodegradable polymer composition according claim 1, further comprising a surfactant.

7. The biodegradable polymer composition according to claim 1, further comprising a dispersing agent.

8. The biodegradable polymer composition according to claim 1, further comprising a biocide.

9. The biodegradable polymer composition according to claim 1, further comprising a plasticizer.

10. A method of preparing a biodegradable polymer comprising the steps of:
a) preparing a mixture of a polyvinyl alcohol and sucrose in an amount ranging from 2 to 80% by weight in water at a temperature of 50° C. or higher to form a polyvinyl alcohol/sucrose mixture; and b) adding a sodium addition salt of a polyacrylic acid to the polyvinyl alcohol/sucrose mixture at a temperature of 50° C. or higher;

thereby providing a biodegradable polymer of sucrose crosslinked polyvinyl alcohol and polyacrylic acid.

11. The method according to claim 10, further comprising the step of dissolving one or more additives into the polyvinyl alcohol/sucrose mixture, wherein the additives are selected from the group consisting of a surfactant, a dispersing agent, a plasticizer and a biocide.

12. The method according to claim 11, wherein the surfactant is (alkyl)betaine.

13. A biodegradable polymer composition comprising a polyvinyl alcohol, a polyacrylic acid and sucrose; wherein the polyvinyl alcohol and the polyacrylic are crosslinked by sucrose in an amount ranging from 2 to 80% by weight in water at a temperature of 50° C. or higher; and wherein sucrose is crosslinked with the polyvinyl alcohol and the polyacrylic acid by chemical bonding via an ether or ester bond and by coordinative bonding via hydrogen bridges and salt bridges.

* * * * *